United States Patent
Takami et al.

(10) Patent No.: US 10,461,313 B2
(45) Date of Patent: Oct. 29, 2019

(54) NONAQUEOUS ELECTROLYTE BATTERY, BATTERY MODULE, AND BATTERY PACK

(71) Applicant: KABUSHIKI KAISHA TOSHIBA, Minato-ku (JP)

(72) Inventors: Norio Takami, Yokohama (JP); Yoshiyuki Isozaki, Tokyo (JP); Tetsuya Sasakawa, Yokohama (JP); Hidesato Saruwatari, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 2 days.

(21) Appl. No.: 14/660,089

(22) Filed: Mar. 17, 2015

(65) Prior Publication Data

US 2016/0036040 A1 Feb. 4, 2016

(30) Foreign Application Priority Data

Jul. 31, 2014 (JP) ................... 2014-156712

(51) Int. Cl.
| | |
|---|---|
| *H01M 4/131* | (2010.01) |
| *H01M 4/485* | (2010.01) |
| *H01M 4/66* | (2006.01) |
| *H01M 10/0525* | (2010.01) |
| *H01M 4/02* | (2006.01) |
| *H01M 2/02* | (2006.01) |
| *H01M 4/525* | (2010.01) |
| *H01M 10/42* | (2006.01) |

(52) U.S. Cl.
CPC .......... *H01M 4/131* (2013.01); *H01M 4/485* (2013.01); *H01M 4/661* (2013.01); *H01M 4/662* (2013.01); *H01M 10/0525* (2013.01); *H01M 2/0277* (2013.01); *H01M 2/0285* (2013.01); *H01M 2/0287* (2013.01); *H01M 4/525* (2013.01); *H01M 2004/027* (2013.01); *H01M 2010/4292* (2013.01); *H01M 2220/20* (2013.01); *Y02T 10/7011* (2013.01)

(58) Field of Classification Search
CPC ...... H01M 4/362; H01M 4/364; H01M 4/131; H01M 4/485; H01M 10/052; H01M 10/4257; H01M 10/48; H01M 2220/20; H01M 4/661; H01M 4/662; H01M 2010/4292; H01M 4/525; H01M 2/0287; H01M 2/0285; H01M 2/0277; H01M 2004/027; H01M 10/0525; Y02T 10/7011
See application file for complete search history.

(56) References Cited

U.S. PATENT DOCUMENTS

| | | | | |
|---|---|---|---|---|
| 2002/0076605 | A1* | 6/2002 | Akashi | H01M 4/13 429/60 |
| 2005/0069777 | A1 | 3/2005 | Takami et al. | |
| 2006/0257746 | A1* | 11/2006 | Inagaki | C01G 23/00 429/231.5 |
| 2007/0059592 | A1 | 3/2007 | Takami et al. | |
| 2010/0297490 | A1* | 11/2010 | Takami | H01M 2/1633 429/131 |
| 2012/0009449 | A1 | 1/2012 | Inagaki et al. | |
| 2012/0058379 | A1 | 3/2012 | Kishi et al. | |
| 2013/0040187 | A1 | 2/2013 | Inagaki et al. | |

FOREIGN PATENT DOCUMENTS

| | | |
|---|---|---|
| CN | 1233059 C | 12/2005 |
| CN | 100448097 C | 12/2008 |
| CN | 101911373 A | 12/2010 |
| JP | 2001-143702 A | 5/2001 |
| JP | 3619125 B2 | 2/2005 |
| JP | 2005-123183 A | 5/2005 |
| JP | 3866740 B2 | 1/2007 |
| JP | 2007-103352 A | 4/2007 |
| JP | 2007-335308 A | 12/2007 |
| JP | 2009-38017 A | 2/2009 |
| JP | 2012 59457 | 3/2012 |
| JP | 5203632 B2 | 6/2013 |
| WO | WO 2009/147854 A1 | 12/2009 |

OTHER PUBLICATIONS

Extended European Search Report dated Dec. 15, 2015 in Patent Application No. 15158609.6
Office Action dated Aug. 25, 2015 in European Patent Application No. 15 158 609.6.
U.S. Appl. No. 14/644,879, filed Mar. 11, 2015, Saruwatari, et al.
U.S. Appl. No. 14/659,804, filed Mar. 17, 2015, Sasakawa, et al.

(Continued)

*Primary Examiner* — Stephen J Yanchuk
*Assistant Examiner* — Philip A. Stuckey
(74) *Attorney, Agent, or Firm* — Oblon, McClelland, Maier & Neustadt, L.L.P.

(57) ABSTRACT

According to one embodiment, there is provided a nonaqueous electrolyte battery including a nonaqueous electrolyte, a positive electrode and a negative electrode. The positive electrode includes a positive electrode current collector containing Al, and a positive electrode active material containing layer. The negative electrode includes a negative electrode current collector containing Al, and a negative electrode active material containing layer. The negative electrode active material containing layer includes titanium-containing oxide particles having an average secondary particle size of more than 5 μm. The nonaqueous electrolyte battery satisfies a formula (1) of Lp<Ln.

14 Claims, 4 Drawing Sheets

(56) References Cited

OTHER PUBLICATIONS

U.S. Appl. No. 14/659,985, filed Mar. 17, 2015, Hoshina, et al.
Combined Chinese Office Action and Search Report dated Apr. 24, 2017 in Patent Application No. 201510115385.0 (with English Translation of Category of Cited Documents).
Office Action dated Mar. 7, 2017 in European Patent Application No. 15 158 609.6.
Japanese Office Action dated Jun. 20, 2017 in Japanese Patent Application No. 2014-156712.

* cited by examiner

NONAQUEOUS ELECTROLYTE BATTERY, BATTERY MODULE, AND BATTERY PACK

CROSS-REFERENCE TO RELATED APPLICATIONS

This application is based upon and claims the benefit of priority from Japanese Patent Application No. 2014-156712, filed Jul. 31, 2014, the entire contents of which are incorporated herein by reference.

FIELD

Embodiments described herein relate generally to a nonaqueous electrolyte battery, battery module and battery pack.

BACKGROUND

Nonaqueous electrolyte batteries including a negative electrode including a lithium metal, lithium alloy, lithium compound, or carbonaceous material are expected as high energy density batteries, and intensively studied and developed. Lithium ion batteries including a positive electrode containing $LiCoO_2$ or $LiMn_2O_4$ as an active material, and a negative electrode containing a carbonaceous material which absorbs and releases lithium ions are widely used in mobile devices.

On the other hand, when mounted on cars such as automobiles and trains, the components of the positive and negative electrodes preferably have high chemical and electrochemical stability, strength, and corrosion resistance, thereby providing high storage performance, cycle performance, and long-term reliability of high output at high temperatures (60° C. or higher). Furthermore, high power performance and long cycle life performance at low temperatures (cold climate areas) such as −40° C. may be demanded.

On the other hand, for improving safety performance of nonaqueous electrolytes, incombustible and nonvolatile electrolytic solutions are under development, but they are not still in actual use because they can deteriorate the output properties, low temperature performance, and long life performance. In addition, when mounted on a car or the like, a lithium ion battery is difficult to replace a lead storage battery mounted on the engine room of the car, and has problem with high temperature durability.

In a lithium ion battery, if the thickness of the negative electrode is decreased to increase the density for increasing the output and capacity, the collector has insufficient strength, so that the battery capacity, output performance, cycle life, and reliability may be markedly limited. In addition, if the particle size of the negative electrode active material is increased in place of decreasing the thickness of the negative electrode, the interface resistance of the electrode increases, which makes it more difficult to exploit high performance. In particular, at low temperatures (for example, −20° C. or lower), the rate of utilization of the active material decreases and discharge is difficult.

DETAILED DESCRIPTION

Figure 1:
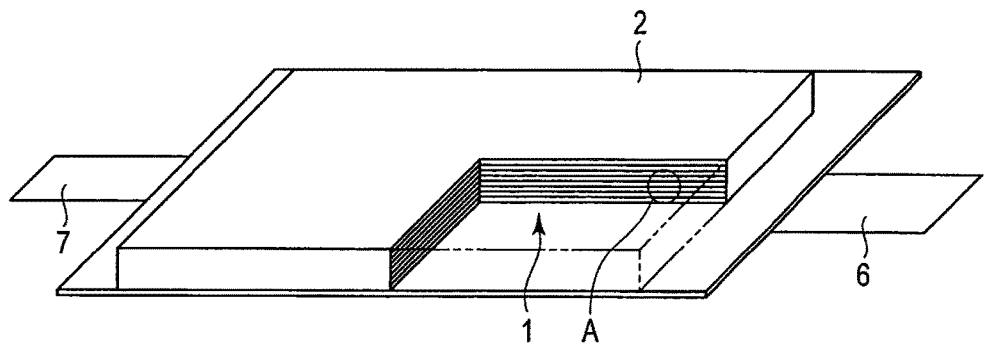
FIG. 1 is a partially cutaway perspective view schematically showing the nonaqueous electrolyte battery according to an embodiment.

According to one embodiment, a nonaqueous electrolyte battery includes a container, a nonaqueous electrolyte housed in the container, a positive electrode housed in the container, and a negative electrode housed in the container. The positive electrode includes an Al-containing positive electrode current collector, and a positive electrode active material containing layer formed on the positive electrode current collector. The negative electrode includes an Al-containing negative electrode current collector, and a negative electrode active material containing layer formed on the negative electrode current collector. The negative electrode active material containing layer includes titanium-containing oxide particles having an average secondary particle of more than 5 μm. The nonaqueous electrolyte battery satisfies the following formula (1):

$$Lp < Ln \quad (1)$$

wherein Lp is the thickness of the positive electrode current collector, and Ln is the thickness of the negative electrode current collector.

The embodiment also provides a battery module and a battery pack including the above-described nonaqueous electrolyte battery.

(First Embodiment)

In the negative electrode including the titanium-containing oxide particles having an average secondary particle size of less than 5 μm, reductive decomposition of the nonaqueous electrolyte proceeds at high temperatures (for example, 70° C. or higher). Therefore, the negative electrode has inferior cycle life performance at high temperatures. If the average particle size of the secondary particles of titanium-containing oxide particles is increased to exceed 5 μm thereby inhibiting reductive decomposition of the nonaqueous electrolyte at high temperatures, the secondary particles are easily cracked when the pressing force during manufacturing the negative electrode is increased thereby increasing the negative electrode density (or negative electrode packing density). If the secondary particles are cracked, many conductive paths between the primary particles in the secondary particles are destroyed, so that the electron resistance of the negative electrode increases. In addition, new surfaces are appeared by cracking of the secondary particles accelerate reductive decomposition of the nonaqueous electrolyte at high temperatures. Therefore, in place of increasing the negative electrode density, the positive electrode density is increased by satisfying the relationship represented by the above-described formula (1), more specifically, making the thickness of the positive electrode current collector Lp smaller than the thickness of the negative electrode current collector Ln. As a result of this, the necessity of increasing the pressing force applied during the manufacturing process of the negative electrode is avoided, so that cracking of the secondary particles of titanium-containing oxide is inhibited. As a result of this, reductive decomposition of the nonaqueous electrolyte at high temperatures is inhibited, without causing the increase in electron resistance of the negative electrode. In addition, the increase in the positive electrode density increases the adhesion strength between the positive electrode active material containing layer and the positive electrode current collector, whereby the decrease in the adhesion strength at high temperatures is inhibited, and the increase in the positive electrode resistance at high temperatures is inhibited.

Accordingly, when the nonaqueous electrolyte battery is mounted on the engine room of an automobile, the increases in the negative and positive electrode resistance are inhibited under conditions including high rate charge-discharge cycle and large current discharge at high temperatures (for example, 70° C. or higher), so that the cycle life performance and large current discharge performance at high temperatures are improved.

When charge-discharge cycles are repeated at a high rate and a high temperature of 70° C. or higher, the increase in the positive electrode resistance is caused by, for example, oxidative decomposition of the nonaqueous electrolyte by the positive electrode active material, and the decrease in adhesion between the positive electrode current collector and positive electrode active material containing layer. On the other hand, the increase in the negative electrode resistance is caused by, for example, the decrease in electron conductivity between the titanium-containing oxide particle.

As a result of the study by the inventors, it was found that oxidative decomposition of the nonaqueous electrolyte at high temperatures by the positive electrode active material is inhibited when the nonaqueous electrolyte battery satisfies the following the formula (2), where the maximum charging voltage of the positive electrode becomes 4 V (4 V vs. Li/Li$^+$) or less with reference to the Li potential.

$$(PW/NW) \geq (NC/PC4) \tag{2}$$

wherein PW is the weight (g) of the positive electrode active material containing layer, NW is the weight (g) of the negative electrode active material containing layer, PC4 is the charging capacity per weight (mAh/g) when the maximum charging voltage of the positive electrode is 4 V with reference to the Li potential (V vs. Li/Li$^+$), and NC is the charging capacity per weight (mAh/g) when the charging voltage of the negative electrode is 1 V with reference to the Li potential (V vs. Li/Li$^+$).

PW is calculated by subtracting the weight of the positive electrode current collector from the weight of the positive electrode weight, and NW is calculated by subtracting the weight of the negative electrode current collector from the weight of the negative electrode.

In the nonaqueous electrolyte battery satisfying the formula (2), the weight of the positive electrode active material containing layer is greater than the weight of the negative electrode active material, and the charging capacity per weight PC4 when the maximum charging voltage of the positive electrode is 4 V with reference to the Li potential (V vs. Li/Li$^+$) is smaller than the charging capacity per weight NC when the charging voltage of the negative electrode is 1 V with reference to the Li potential (V vs. Li/Li$^+$). As a result of this, the end of charging depends on the potential change of the negative electrode, and charging finishes before the charging potential of the positive electrode reaches 4.2 V, so that resistance increase by oxidative decomposition of the nonaqueous electrolyte by the positive electrode active material at high temperatures is inhibited.

In the nonaqueous electrolyte battery satisfying the formula (2), the positive electrode active material containing layer is thick, but the formula (1) is satisfied, so that the adhesion strength between the positive electrode active material containing layer and the positive electrode current collector is high. As a result of this, the electron resistance between the positive electrode active material containing layer and the positive electrode current collector is reduced, so that low resistance is maintained even after the charge-discharge cycle.

In the titanium-containing oxide particles contained in the negative electrode, the absorbing and releasing potential for Li is preferably from 1 to 3 V with reference to the Li potential (V vs. Li/Li$^+$). In addition, the active material may be contained alone or in combination of two or more. The titanium-containing oxide particles preferably contains one or more compounds selected from the group consisting of lithium titanium oxide, titanium oxide, and niobium titanium oxide. Examples of the lithium titanium oxide include lithium titanium oxide having a spinel structure (for example, general formula Li$_{4/3+x}$Ti$_{5/3}$O$_4$ (0≤x≤1.1)), lithium titanium oxide having a ramsdellite structure (for example, Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0≤x≤1).

Examples of the titanium oxide include those having a monoclinic system structure, rutile structure, and an anatase structure. Examples of the titanium oxide having a monoclinic system structure include those represented by the general formula Li$_x$TiO$_2$ (0≤x, more preferably 0≤x≤1), i.e., the titanium oxide having a bronze structure (B). The constitution of the titanium oxide having a rutile structure or anatase structure before charging can be represented by TiO$_2$. Irreversible Li may remain in the titanium oxide after charge and discharge of the battery, so that the titanium oxide after charge and discharge of the battery can be represented by Li$_x$TiO$_2$ (0≤x, more preferably 0<x≤1).

Examples of the niobium titanium oxide include those represented by Li$_a$TiM$_b$Nb$_{2\pm\beta}$O$_{7\pm\sigma}$ (0≤a≤5, 0≤b≤0.3, 0≤β≤0.3, 0≤σ≤0.3, wherein M is one or more elements selected from the group consisting of Fe, V, Mo, and Ta).

The titanium-containing oxide particles are preferably lithium titanium oxide having a spinel structure. Lithium titanium oxide having a spinel structure causes less volume change during charge-discharge, and suppresses the resistance increase caused by reductive decomposition of the nonaqueous electrolyte in the negative electrode, whereby the cycle life performance is improved. In addition, aluminum or aluminum alloy foil may be used in place of copper foil to make the negative electrode current collector, thereby decreasing the weight and cost.

The average particle size (average diameter) of the primary particles of the titanium-containing oxide particles is preferably 1 μm or less. As a result of this, improvements in the discharge rate performance and high input performance (quick charge performance) are expected. The reason is due to that, for example, the diffusion distance of lithium ions in the active material is shortened, and the specific surface area increases. The average particle size is more preferably from 0.1 to 0.8 μm.

The titanium-containing oxide particles may be the secondary particles alone or a mixture of the primary and secondary particles. In order to further increase the density, the proportion of the primary particles in the titanium-containing oxide particles is preferably from 5 to 50% by volume. The average particle size (average diameter) of the secondary particles is more preferably from 7 to 20 μm. When the average particle size is within this range, a negative electrode having a high density is produced while the pressing force during manufacturing the negative electrode is kept low, and the stretch of the negative electrode current collector can be suppressed.

The positive electrode current collector is preferably aluminum foil or aluminum alloy foil having an aluminum purity of 99% by weight or more, and a thickness Lp of 20 µm or less. The aluminum purity is more preferably 99.5% by weight or more. The thickness of the positive electrode current collector is preferably from 5 µm to 15 µm. When the purity and thickness are within these ranges, the binding force between the positive electrode active material containing layer and the positive electrode current collector is improved, whereby the increase in electron resistance of the positive electrode at high temperatures is inhibited. On the other hand, if a pure aluminum foil collector having a purity of 100% by weight is used, the collector is excessively stretcheded under a high pressing force, which can result in difficulty in increasing the binding force between the positive electrode active material containing layer and the positive electrode current collector.

A positive electrode active material is contained in the positive electrode active material containing layer. Examples of the positive electrode active material include lithium manganese composite oxides, lithium nickel composite oxides, lithium cobalt aluminum composite oxides, lithium nickel cobalt manganese composite oxides, spinel type lithium manganese nickel composite oxides, lithium manganese cobalt composite oxides, olivine type lithium iron phosphates (for example, $LiFePO_4$), and olivine type lithium manganese phosphates (for example, $LiMnPO_4$). They can achieve a high positive electrode potential.

Examples of the lithium manganese composite oxide include $Li_xMn_2O_4$ and $Li_xMnO_2$ ($0 \leq x \leq 1$). Examples of the lithium nickel aluminum composite oxide include $Li_xNi_{1-y}Al_yO_2$ ($0 \leq x \leq 1$, $0 \leq y \leq 1$ (more preferably $0 < y < 1$)). Examples of the lithium cobalt composite oxide include $Li_xCoO_2$ ($0 \leq x \leq 1$). Examples of the lithium nickel cobalt composite oxide include $Li_xNi_{1-y-z}Co_yMn_zO_2$ ($0 \leq x \leq 1$, $0 \leq y \leq 1$ (more preferably $0 < y < 1$), $0 \leq z \leq 1$ (more preferably $0 < z < 1$)). Examples of the lithium manganese cobalt composite oxide include $Li_xMn_yCo_{1-y}O_2$ ($0 \leq x \leq 1$, $0 \leq y \leq 1$ (more preferably $0 < y < 1$)). Examples of the spinel lithium manganese nickel composite oxide include $Li_xMn_{2-y}Ni_yO_4$ ($0 \leq x \leq 1$, $0 \leq y \leq 2$ (more preferably $0 < y < 2$)). Examples of the lithium phosphate having olivine structure include $Li_xFePO_4$, $Li_xFe_{1-y}Mn_yPO_4$, $Li_xCoPO_4$ ($0 \leq x \leq 1$, $0 \leq y \leq 1$ (more preferably $0 < y < 1$)), and fluorinated iron sulfates (for example, $Li_xFeSO_4F$ ($0 \leq x \leq 1$)). When x is 1, Li is completely released from the positive electrode active material by charging.

A lithium nickel aluminum composite oxide, lithium nickel cobalt manganese composite oxide, or lithium manganese cobalt composite oxide inhibits the reaction with the nonaqueous electrolyte at high temperatures, whereby the battery life is markedly improved. The composite oxide represented by $Li_xNi_{1-y-z}Co_yMn_zO_2$ ($0 \leq x \leq 1.1$, $0 \leq y \leq 0.5$ (more preferably $0 < y \leq 0.5$), $0 \leq z \leq 0.5$ (more preferably $0 < z \leq 0.5$)) provides an excellent cycle life at high temperature.

The form of the nonaqueous electrolyte battery may be a rectangular battery, a cylindrical battery, or a slim battery. The container may be, for example, a metal container or a laminate film container including a metal layer and a resin layer. The laminate film container is more preferred, thereby achieving the weight reduction.

The negative electrode, positive electrode, nonaqueous electrolyte, and container are described below.

1) Negative Electrode

The negative electrode includes a negative electrode current collector, and a negative electrode active material containing layer which is supported on one side or both sides of the negative electrode current collector, and contains a negative electrode active material, a conductive agent, and a binder.

Examples of the Al-containing negative electrode current collector include aluminum foil and aluminum alloy foil. The purity of aluminum may be from 98% to 100% by weight. The purity of pure aluminum is 100% by weight. More preferably, the aluminum purity is from 98.0 to 99.95% by weight. Examples of the metal other than aluminum composing the aluminum alloy include one or more elements selected from the group consisting of iron, magnesium, zinc, manganese, and silicon. For example, Al—Fe, Al—Mn, and Al—Mg alloys can achieve higher strength than aluminum. On the other hand, the content of the transition metal such as nickel or chromium in the aluminum and aluminum alloy is preferably 100 ppm or less by weight (including 0 ppm by weight). For example, the use of an Al—Cu alloy increases strength, but decreases corrosion resistance.

If the pressing force during manufacturing the negative electrode is reduced, thereby avoiding cracking of the titanium-containing oxide particles having an average secondary particle size of more than 5 µm, the stretch of the negative electrode current collector during pressing can be reduced. As a result of this, a high negative electrode current collector having an aluminum purity of 98% to 100% by weight and high electron conductivity can be used.

For the thickness of the negative electrode current collector Ln, the final Ln after pressing the negative electrode is preferably from 10 to 25 µm. When the Ln is within this range, the stretch of the negative electrode current collector by pressing during manufacturing the negative electrode is small, and the electron resistance of the negative electrode current collector is low. When the Ln is greater than this range, the thickness of the negative electrode increases. When the Ln is below this range, cracking of the titanium-containing oxide particles increases, and the increase in the electrode resistance and resistance increase during the high temperature cycle may be accelerated.

The titanium-containing oxide particles having an average secondary particle size of more than 5 µm are obtained by making an active material precursor having an average particle size of 1 µm or less by the reaction and synthesis of raw active materials, subjecting the active material precursor to sintering treatment, and then grinding treatment using a grinder such as a ball mill or jet mill, and then the active material precursor is aggregated in the sintering treatment to grow it into secondary particles having a larger particle size. In addition, covering of the secondary particle surface with a carbon material is preferred for reducing the negative electrode resistance. It can be made by adding a carbon material precursor during manufacturing the secondary particles, and sintering in an inert atmosphere at 500° C. or higher.

The conductive agent for increasing the electron conductivity in the negative electrode active material containing layer, and suppressing the contact resistance to the collector may be a carbon material. Examples of the carbon material include acetylene black, carbon black, coke, carbon fiber, and graphite.

Examples of the binder for binding the active material and conductive agent include polytetrafluoroethylene (PTFE), polyvinylidene fluoride (PVdF), fluorine rubber, styrene butadiene rubber, and polyacrylic acid.

The proportions of the active material, conductive agent, and binder in negative electrode are preferably from 80% to 95% by weight for the negative electrode active material, from 3% to 18% by weight for the conductive agent, and from 2% to 7% by weight for the binder. When the content of the conductive agent is 3% by weight or more, the above-described effect is achieved, and when 18% by weight or less, decomposition of the nonaqueous electrolyte on the conductive agent surface during storage at high temperatures decreases. When the content of the binder is 2% by weight or more, a sufficient electrode strength is obtained, and when 7% by weight or less, the electrically insulating portion of the electrode is decreased.

The density of the negative electrode is preferably from 1.5 g/cm$^3$ to 5 g/cm$^3$. As a result of this, a high battery volume is obtained. Even more preferred range is from 2 g/cm$^3$ to 4 g/cm$^3$.

The negative electrode is made by suspending a negative electrode active material, a conductive agent, and a binder in an appropriate solvent, applying the suspension to a negative electrode current collector, drying the suspension, and then pressing the collector. The pressing force when manufacturing the negative electrode is preferably from 0.1 ton/mm to 0.2 ton/mm. Within this preferred range, cracking of the secondary particles is suppressed, and the percent stretch of the negative electrode current collector is 10% or less.

2) Positive Electrode

The positive electrode includes a positive electrode current collector, and a positive electrode active material containing layer which is supported on one side or both sides of the positive electrode current collector, and contains a positive electrode active material, a conductive agent, and a binder.

Examples of the Al-containing positive electrode current collector include aluminum foil and aluminum alloy foil. The purity of aluminum may be from 99% to 100% by weight. The purity of pure aluminum is 100% by weight. The aluminum alloy preferably include aluminum and one or more elements selected from the group consisting of iron, magnesium, zinc, manganese, and silicon. For example, Al—Fe, Al—Mn, and Al—Mg alloys can achieve a higher strength than aluminum. On the other hand, the content of the transition metal such as nickel or chromium in the aluminum and aluminum alloy is preferably 100 ppm or less by weight (including 0 ppm by weight). For example, the use of an Al—Cu alloy increase the strength, but decrease corrosion resistance. The aluminum purity is more preferably from 99.0 to 99.99% by weight. Within this range, deterioration of the high temperature cycle life caused by dissolution of impurity elements is reduced.

The thickness of the positive electrode current collector Lp is smaller than the thickness of the negative electrode current collector Ln. The reason for this is that the stretch of the positive electrode current collector by pressing is increased to exceed that of the negative electrode current collector by increasing the pressing force during manufacturing the positive electrode to exceed the pressing force during manufacturing the negative electrode. As a result of this, adhesion between the positive electrode active material containing layer and the positive electrode current collector is improved to decrease resistance between them, the packing density of the positive electrode active material containing layer is improved, and the thickness of the positive electrode is reduced, so that the resistance increase by the charge-discharge cycle at high temperatures is inhibited. As a result of this, the large current discharge performance and cycle life performance at high temperatures are improved.

The thickness of the positive electrode current collector Lp is preferably 20 μm or less. The final Lp of the positive electrode made through pressing is more preferably from 5 to 15 μm. When the Lp is within this range, the stretch of the positive electrode current collector by pressing is greater than that of the negative electrode current collector, so that electron resistance between the positive electrode current collector and the positive electrode active material containing layer is decreased. If the Lp is beyond the range, electron resistance between the positive electrode current collector and the positive electrode active material containing layer increases. If the Lp is below the range, electric resistance of the positive electrode current collector increases.

Explanation about the positive electrode active material is as described above.

Examples of the conductive agent for increasing the electron conductivity and suppressing the contact resistance to the collector include acetylene black, carbon black, and graphite.

Examples of the binder for binding the active material with the conductive agent include polytetrafluoroethylene (PTFE), polyvinylidene fluoride (PVdF), and fluorine rubber.

The proportions of the positive electrode active material, conductive agent, and binder are preferably from 80% to 95% by weight for the positive electrode active material, from 3% to 18% by weight for the conductive agent, and from 2% to 7% by weight for the binder. When the proportion of the conductive agent is 3% by weight or more, the above-described effect is achieved, and when 18% by weight or less, decomposition of the nonaqueous electrolyte on the conductive agent surface during storage at high temperatures is reduced. When the proportion of the binder is 2% by weight or more, a sufficient electrode strength is achieved, and when 7% by weight or less, the electrically insulating portion of the electrode is decreased.

The positive electrode is made by, for example, suspending a positive electrode active material, a conductive agent, and a binder in an appropriate solvent, applying the suspension to a positive electrode current collector, drying the suspension, and pressing the collector. The pressing force is preferably from 0.15 ton/mm to 0.3 ton/mm. When the pressing force is within this range, high adhesion (peel strength) is achieved between the positive electrode active material containing layer and the positive electrode current collector, and the percent stretch of the positive electrode current collector is 20% or less.

3) Nonaqueous Electrolyte

Examples of the nonaqueous electrolyte include a liquid nonaqueous electrolyte prepared by dissolving an electrolyte in an organic solvent, a gelatinous nonaqueous electrolyte prepared by complexing a liquid electrolyte with a polymer material, and a solid nonaqueous electrolyte prepared by complexing a lithium salt electrolyte with a polymer material. In addition, a room temperature molten salt (ionic liquid) containing lithium ions may be used as a nonaqueous electrolyte.

The liquid state nonaqueous electrolyte is prepared by, for example, dissolving an electrolyte in an organic solvent at a concentration of 0.5 to 2 mol/L.

Examples of the electrolyte include $LiBF_4$, $LiPF_6$, $LiAsF_6$, $LiClO_4$, $LiCF_3SO_3$, $LiN(FSO_2)_2$, $LiN(CF_3SO_2)_2$, $LiN(C_2F_5SO_2)_2$, $Li(CF_3SO_2)_3C$, and $LiB[(OCO)_2]_2$. The electrolyte may be used alone or in combination of two or more.

Examples of the organic solvent include cyclic carbonates such as propylene carbonate (PC) or ethylene carbonate (EC), chain carbonates such as diethyl carbonate (DEC) and dimethylcarbonate (DMC) or methylethyl carbonate (MEC), chain ethers such as dimethoxyethane (DME) or diethoxyethane (DEE), cyclic ethers such as tetrahydrofuran (THF) or dioxolane (DOX), γ-butyrolactone (GBL), α-methyl-γ-butyrolactone (MGBL), acetonitrile (AN), and sulfolane (SL). These organic solvents may be used alone or in combination of two or more thereof.

Examples of the more preferred electrolyte include $LiPF_6$, $LiBF_4$, $LiN(FSO_2)_2$ or $LiB[(OCO)_2]_2$. Examples of the more preferred organic solvent include propylene carbonate (PC), ethylene carbonate (EC), diethyl carbonate (DEC), dimethylcarbonate (DMC), methylethyl carbonate (MEC), γ-butyrolactone (GBL) or α-methyl-γ-butyrolactone (MGBL), which may be used alone or in combination of two or more thereof.

Examples of the polymer material include polyvinylidene fluoride (PVdF), polyacrylonitrile (PAN), and polyethylene oxide (PEO).

The room temperature molten salt (ionic liquid) preferably contains a lithium ion, an organic cation, and an organic anion. In addition, the room temperature molten salt is preferably a liquid at 100° C. or lower, preferably at room temperature or lower.

4) Cladding Member (Container)

Examples of the cladding member include a laminate film container and a metal container. The shape of the container conforms to the form of the nonaqueous electrolyte battery. Examples of the form of the nonaqueous electrolyte battery include flat, square, cylindrical, coin, button, sheet, laminated, and large-size batteries mounted on electric vehicles.

The thickness of the laminate film composing the container is preferably 0.5 mm or less, more preferably 0.2 mm or less. In addition, the lower limit of the thickness of the laminate film is preferably 0.01 mm.

On the other hand, the plate thickness of the metal container is more preferably 0.5 mm or less. In addition, the lower limit of the plate thickness of the metal container is preferably 0.05 mm.

Examples of the laminate film include a multilayer film including a metal layer and a resin layer covering the metal layer. For weight reduction, the metal layer is preferably aluminum foil or aluminum alloy foil. The resin layer is provided for reinforcing the metal layer, or for electrical insulation. The resin layer may be formed from a polymer such as polypropylene (PP), polyethylene (PE), nylon, or polyethylene terephthalate (PET).

The laminate film container is obtained by, for example, bonding laminate film by heat sealing.

The metal container is preferably formed from aluminum or aluminum alloy. A container made of an aluminum alloy has a high strength, so that sufficient mechanical strength is assured even if the wall thickness of the container is decreased. As a result of this, heat dissipation of the container is improved, whereby the increase of the battery temperature is inhibited. In addition, the improvement in the energy density allows weight and size reduction of the battery. These features are suitable for batteries required to have high temperature resistance and a high energy density, such as in-vehicle secondary batteries. The aluminum alloy is preferably an alloy containing one or more elements selected from the group consisting of magnesium, zinc, and silicon. On the other hand, the content of transition metals such as iron, copper, nickel or chromium in the aluminum and aluminum alloy is preferably 100 ppm or less by weight, respectively.

The metal container may be sealed by laser. As a result of this, the volume of the sealing part is decreased, and the energy density is improved in comparison with that of a laminate film container.

The nonaqueous electrolyte battery according to the embodiment may further include a separator arranged between the positive and negative electrodes.

5) Separator

Examples of the separator include cellulose nonwoven fabric, synthetic resin nonwoven fabric, a polyethylene porous film, and a polypropylene porous film. The thickness of the separator may be from 5 to 30 μm.

Figure 2:
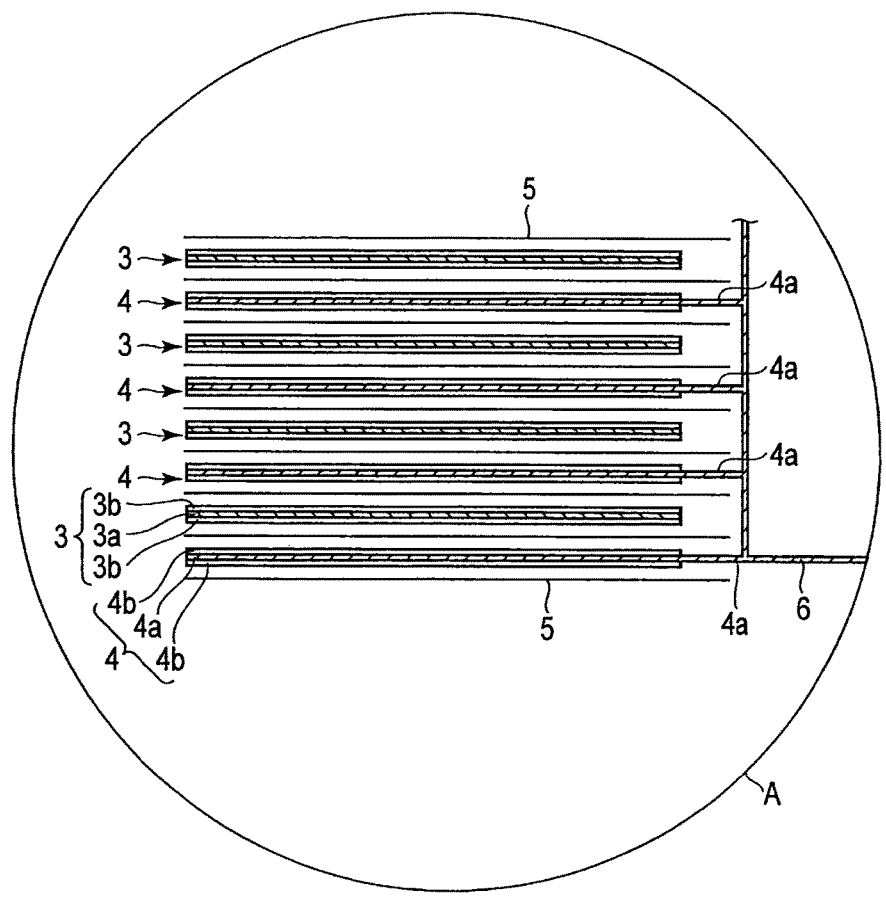
FIG. 2 is an enlarged cross sectional view of the section A in FIG. 1.

The nonaqueous electrolyte battery according to the embodiment may be a nonaqueous electrolyte battery of any form such as an angular, cylindrical, flat, slim, or coin battery. FIGS. 1 and 2 show an example of the nonaqueous electrolyte battery including a laminate film container. FIG. 1 is a partially cutaway perspective view schematically showing the nonaqueous electrolyte battery according to an embodiment, and FIG. 2 is an enlarged cross sectional view of the section A in FIG. 1. These figures are schematic views for explanation, and the shape, dimension, and ratio may be different from those in an actual apparatus. The design may be appropriately changed in consideration of the following explanation and known techniques.

A laminated electrode group 1 is housed in a bag container 2 made of laminate film which includes a metal layer sandwiched between two layers of resin film. As shown in FIG. 2, the laminated electrode group 1 has a structure wherein positive electrodes 3 and negative electrodes 4 are alternately laminated, with separators 5 sandwiched therebetween. A plurality of positive electrodes 3 are present, and each of them includes a positive electrode current collector 3a, and positive electrode active material containing layers 3b formed on both sides of the positive electrode current collector 3a. A plurality of negative electrodes 4 are present, and each of them includes a negative electrode current collector 4a, and negative electrode active material containing layer 4b formed on both sides of the negative electrode current collector 4a. The negative electrode current collector 4a of each of the negative electrodes 4 protrudes from the positive electrode 3 at one side. The protruding negative electrode current collector 4a is electrically connected to a negative electrode terminal strip 6. The tip of the negative electrode terminal strip 6 is drawn out of the container 2. In addition, not shown, the positive electrode current collector 3a of the positive electrode 3 protrudes from the negative electrode 4 at the side opposed to the protruding side of the negative electrode current collector 4a. The positive electrode current collector 3a protruding from the negative electrode 4 is electrically connected to a positive electrode terminal strip 7. The tip of the positive electrode terminal strip 7 locates at the side opposite to the negative electrode terminal 6, and drawn out of the container 2 at the side.

Figure 3:
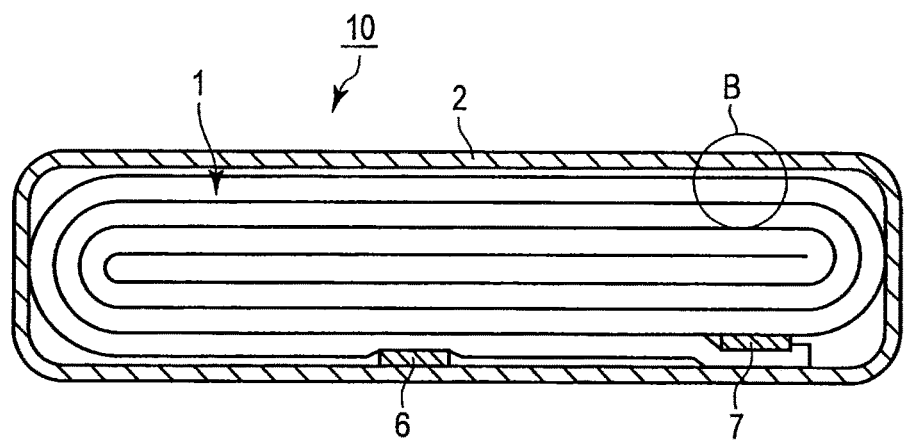
FIG. 3 is a cross sectional view of the nonaqueous electrolyte battery according to an embodiment.

In FIGS. 1 and 2, an example using a laminated electrode group is explained, but the structure of the electrode group is not limited to a laminate, and may be a cylinder or flat wound structure. For an example of a nonaqueous electrolyte battery including a spiral electrode group, the structure is described with reference to FIGS. 3 and 4. FIG. 3 is a cross sectional view of a flat nonaqueous electrolyte secondary battery 10, and FIG. 4 is an enlarged cross sectional view of the section B of FIG. 3.

As shown in FIG. 3, a flat wound electrode group 1 is housed in a cladding member 2. The wound electrode group 1 has a structure including a positive electrode 3, a negative electrode 4, and a separator 5 sandwiched between them, these components being wound in a flat spiral. The nonaqueous electrolyte is retained in the wound electrode group 1.

Figure 4:
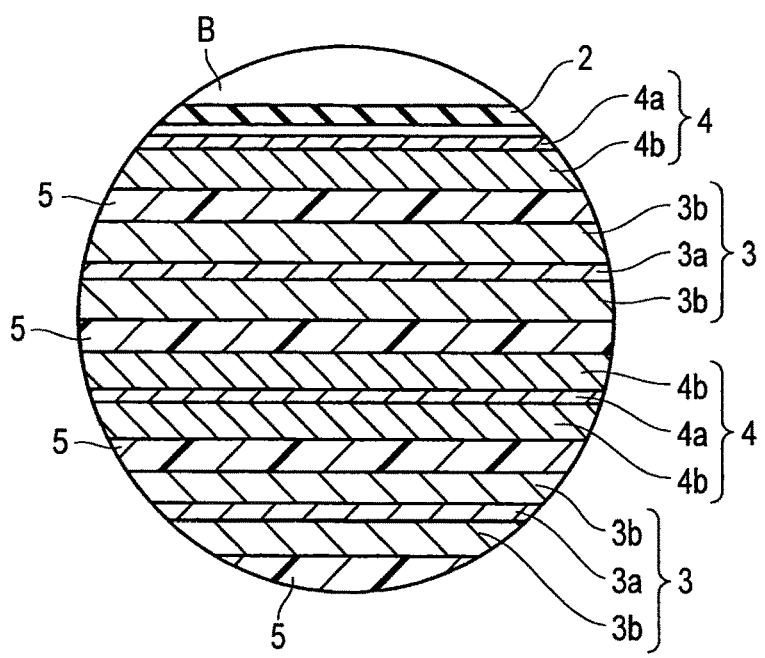
FIG. 4 is an enlarged cross sectional view of the section B in FIG. 3.

As shown in FIG. 4, the negative electrode 4 is located at the outermost periphery of the wound electrode group 1, and a positive electrode 3 and a negative electrode 4 are alternately stacked with a separator 5 sandwiched therebetween, in the order of the separator 5, positive electrode 3, separator 5, negative electrode 4, separator 5, positive electrode 3, and separator 5 at the inner periphery of the negative electrode 4. The negative electrode 4 includes a negative electrode current collector 4a and a negative electrode active material containing layer 4b supported on the negative electrode current collector 4a. In the area located at the outermost periphery of the negative electrode 4, the negative electrode active material containing layer 4b is formed on only one side of the negative electrode current collector 4a. The other negative electrode 4 includes the negative electrode active material containing layers 4b formed on both sides of the negative electrode current collector 4a. The positive electrode 3 includes the positive electrode current collector 3a, and one or more positive electrode active material containing layer 3b supported on the positive electrode current collector 3a.

As shown in FIG. 3, a positive electrode terminal 7 is electrically connected to the positive electrode current collector 3a near the outer peripheral edge of the wound electrode group 1. On the other hand, a negative electrode terminal strip 6 is electrically connected to the negative electrode current collector 4a near the outer peripheral edge of the wound electrode group 1. The tips of the positive electrode terminal 7 and negative electrode terminal 6 are drawn out of the cladding member 2 at the same side.

The nonaqueous electrolyte battery according to the first embodiment includes a negative electrode containing titanium-containing oxide particles having an average secondary particle size of more than 5 μm and satisfies the formula (1), so that the high rate charge-discharge cycle life performance and large current discharge performance at high temperatures are improved. Therefore, a nonaqueous electrolyte battery useful as a secondary battery alternative to a lead battery used as a power source of vehicle starter, or as an in-vehicle secondary battery mounted on a hybrid car is provided.

(Second Embodiment)

A second embodiment provides a battery module including nonaqueous electrolyte batteries as unit cells, and a battery pack including the battery module. The nonaqueous electrolyte battery may be the nonaqueous electrolyte battery of the first embodiment.

Examples of the battery module include those including a plurality of unit cells which are electrically connected in series or parallel, and those including a unit including a plurality of unit cells which are electrically connected in series, and another unit including a plurality of unit cells which are electrically connected in parallel.

Examples of the form of serial or parallel electrical connection of a plurality of nonaqueous electrolyte batteries include serial or parallel electrical connection of a plurality of batteries each having a container, and serial or parallel electrical connection of a plurality of electrode groups housed in a common cabinet. According to a specific example of the former, a plurality of nonaqueous electrolyte batteries whose positive and negative electrode terminals are connected by a metal bus bar. Examples of a material for the metal bus bar include aluminum, nickel, and copper. According to a specific example of the latter, a plurality of electrode groups are housed in one cabinet with electrochemically insulated by a diaphragm, and these electrode groups are electrically connected in series. When the number of the batteries electrically connected in series is from 5 to 7, an appropriate voltage compatibility is achieved for a lead storage battery. A battery module including the units electrically and serially connected six nonaqueous electrolyte batteries each having a positive electrode containing a composite oxide represented by $Li_xNi_{1-y-z}Co_yMn_zO_2$ ($0 \le x \le 1.1$, $0 \le y \le 0.5$, $0 \le z \le 0.5$) provides an excellent cycle life at high temperature.

A battery pack is described in detail with reference to FIGS. 5 and 6. A plurality of unit cells 21 composed of the flat nonaqueous electrolyte battery shown in FIG. 3 are stacked in such a manner that a negative electrode terminal 6 and a positive electrode terminal 7 extending out are oriented in the same direction, and bound by adhesive tape 22 to make a battery module 23. These unit cells 21 are electrically serially connected to each other as shown in FIG. 6.

A printed circuit board 24 is located opposed to a side of the unit cells 21 from which the negative electrode terminal 6 and positive electrode terminal 7 are extended. As shown in FIG. 6, a thermistor 25, a protective circuit 26, and an energizing terminal 27 to an external device are mounted on the printed circuit board 24. An insulating plate (not shown) is mounted on a surface of the printed circuit board 24 opposite to the battery module 23, thereby avoiding unnecessary connection with the line of the battery module 23.

A positive electrode lead 28 is connected to the positive electrode terminal 7 located on the lowermost layer of the battery module 23, and its tip is inserted into and electrically connected to a positive electrode connector 29 of the printed circuit board 24. A negative electrode lead 30 is connected to a negative electrode terminal 6 located on the uppermost layer of the battery module 23, and its tip is inserted into and electrically connected to a negative electrode connector 31 of the printed circuit board 24. These connectors 29 and 31 are connected to a protective circuit 26 through the lines 32 and 33 formed on the printed circuit board 24.

Thermistor 25 is used to detect the temperature of the unit cells 21. The detection signal is sent to the protective circuit 26. The protective circuit 26 can shut down a plus wiring 34a and a minus wiring 34b between the protective circuit 26 and the energizing terminals 27 to an external instrument under a predetermined condition. For example, the predetermined condition indicates when the detection temperature of the thermistor 25 becomes a predetermined temperature or more. Or, the predetermined condition indicates when the over-charge, over-discharge, and over-current of the unit cells 21 are detected. The over-charge detection may be performed on each of the unit cells 21 or the battery module. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of FIGS. 5 and 6, wirings 35 for voltage detection are connected to the unit cells 21 and detection signals are sent to the protective circuit 26 through the wirings 35.

Protective sheets 36 comprised of rubber or resin are arranged on three side planes of the battery module 23 except the side plane in which the positive electrode terminal 7 and the negative electrode terminal 6 are protruded.

The battery module 23 is housed in a housing case 37 together with each of the protective sheets 36 and the printed wiring board 24. That is, the protective sheets 36 are arranged on both internal planes in a long side direction and on one of the internal plane in a short side direction of the housing case 37. The printed wiring board 24 is arranged on the other internal plane at the opposite side in a short side direction. The battery module 23 is located in a space surrounded by the protective sheets 36 and the printed wiring board 24. A lid 38 is attached to the upper plane of the housing case 37.

In order to fix the battery module 23, a heat-shrinkable tape may be used in place of the adhesive tape 22. In this case, the battery module is bound by placing the protective sheets on the both surfaces of the battery module, revolving the heat-shrinkable tape, and thermally shrinking the heat-shrinkable tape.

Figure 5:
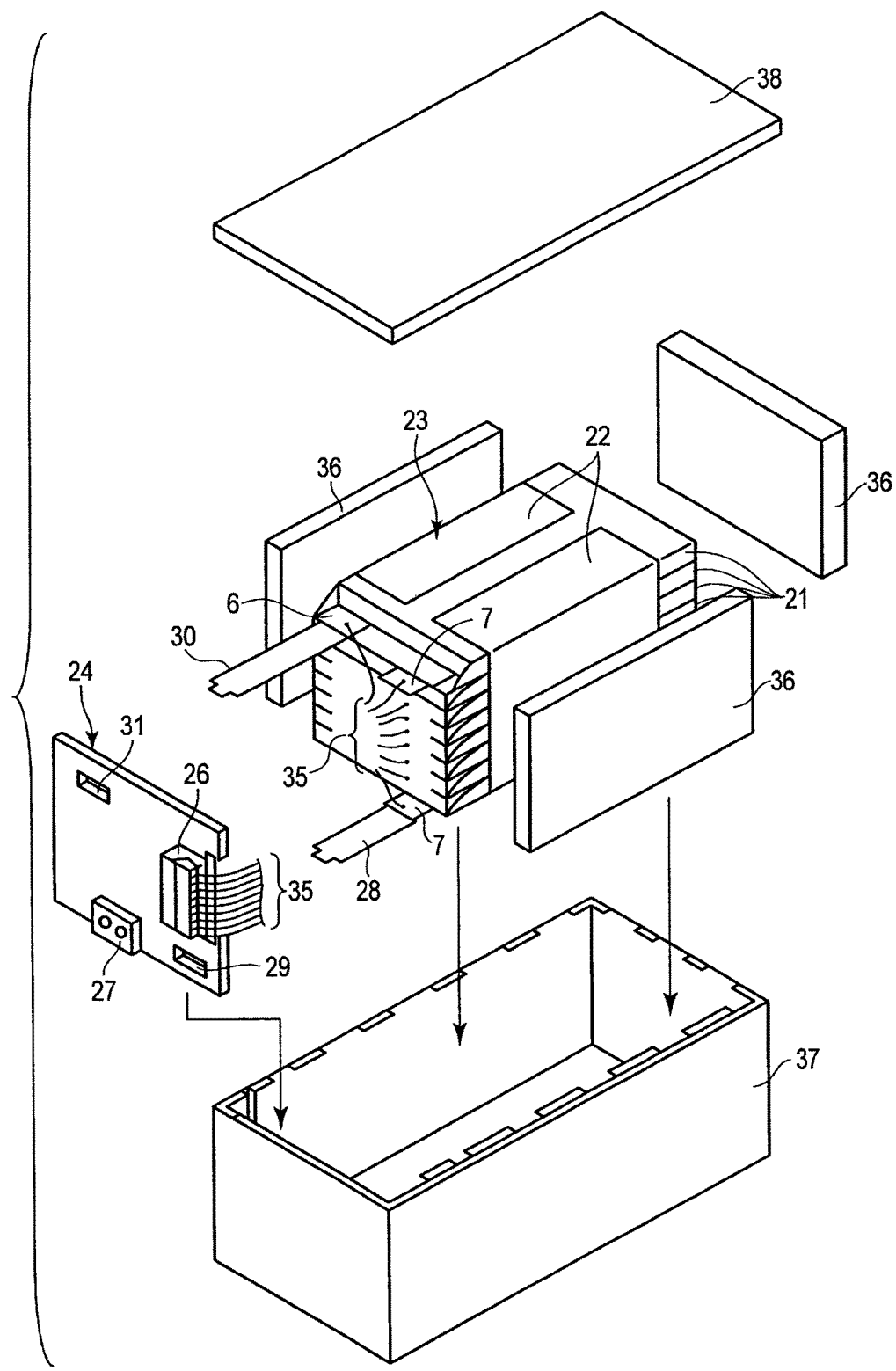
FIG. 5 is an exploded perspective view of the battery pack according to an embodiment.
Figure 6:
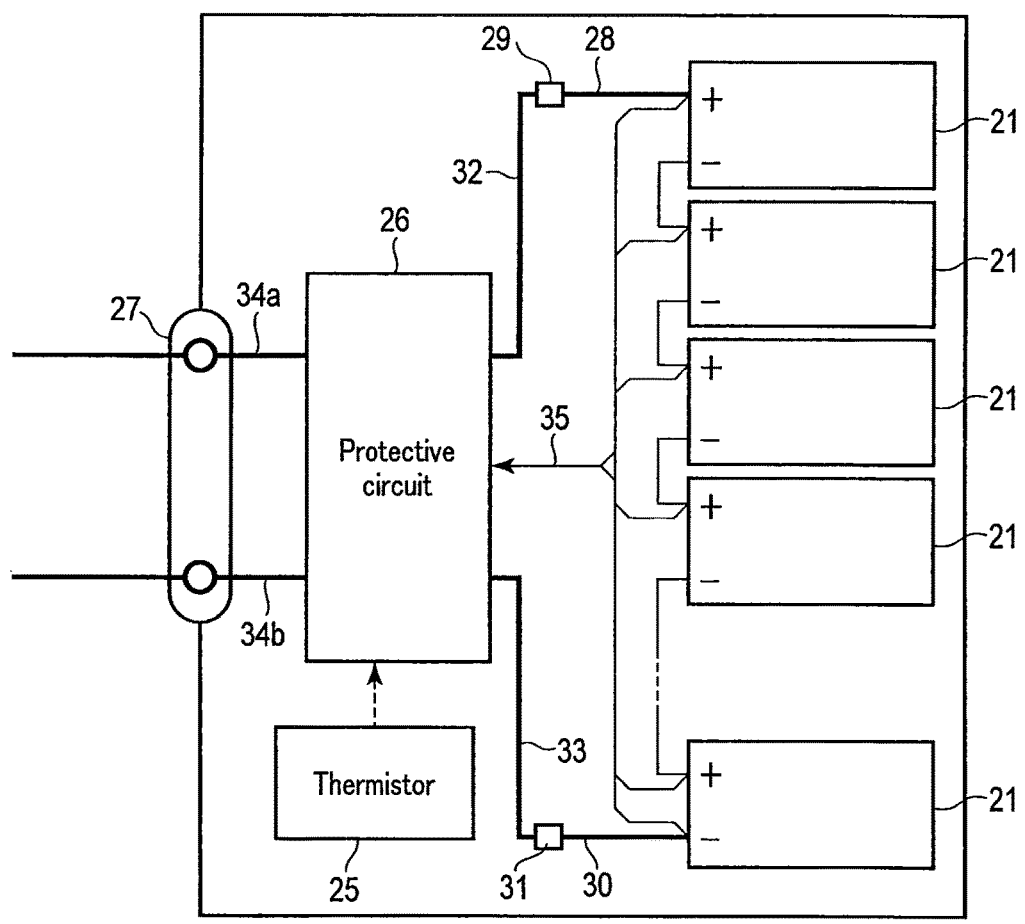
FIG. 6 is a block diagram showing the electric circuit of the battery pack in FIG. 5.

In FIGS. 5 and 6, the form in which the unit cells 21 are connected in series is shown. However, in order to increase the battery capacity, the cells may be connected in parallel. Alternatively, the cells may be formed by combining series connection and parallel connection. The assembled battery pack can be connected in series or in parallel.

The embodiment of the battery pack is appropriately changed according to the use. The battery pack according to the embodiment is used suitably for the application which requires the excellent cycle characteristics at a high current. It is used specifically as a power source for digital cameras, for vehicles such as two- or four-wheel hybrid electric vehicles, for two- or four-wheel electric vehicles, and for assisted bicycles. Particularly, it is suitably used as a battery for automobile use.

The second embodiment described above includes the nonaqueous electrolyte battery of the first embodiment, so that a battery module and a battery pack having improved high rate charge-discharge cycle life performance and large current discharge performance at high temperatures are provided. Therefore, the battery module and battery pack thus provided are suitable as a power source alternative to lead batteries used as a power source starting a vehicle, or as in-vehicle secondary batteries mounted on a hybrid car.

EXAMPLE

The examples of the present invention are described below with reference to the above-described drawings. The present invention will not be limited to the following examples, without departing from the scope of the present invention.

Example 1

<Producing of Negative Electrode>

Lithium titanate ($Li_{4/3}Ti_{5/3}O_4$) powder as a negative electrode active material having an average secondary particle size of 8 μm and an Li absorbing potential pf 1.55 V (vs. Li/Li$^+$), carbon powder as a conductive agent having an average particle size of 0.4 μm, and polyvinylidene fluoride (PVdF) as a binder were mixed at a weight ratio of 90:7:3, and the mixture was dispersed in an n-methylpyrrolidone (NMP) solvent to make a slurry.

The secondary and primary particle sizes of the active material were measured using a laser diffraction particle size distribution analyzer (manufactured by Shimadzu Co., Ltd., model number SALD-300) and an electron microscope. Firstly, about 0.1 g of the sample was placed in, for example, a beaker, a surfactant and 1 to 2 mL of distilled water were added and thoroughly stirred, and injected into a stirring water bath. Using a laser diffraction particle size distribution analyzer, the light intensity distribution was measured 64 times at intervals of 2 seconds, the particle size distribution data was analyzed, and the particle size having a cumulative frequency distribution of 50% (D50) was recorded as the average particle size. In addition, as a result of the observation using an electron microscope, it was found that the proportion of the primary particles (primary particles which are present alone and does not compose secondary particles) in the negative electrode active material is 20% in terms of the volume ratio, and that the average particle size of the primary particles is 0.6 μm.

The slurry thus obtained was applied to an aluminum foil collector having a purity of 99% by weight, dried, and then the collector was pressed (pressing force: 0.12 ton/mm), thereby making a negative electrode having an electrode density of 2.1 g/cm$^3$. On the other hand, the thickness of the negative electrode current collector Ln was 16 μm from the microscopic image of a cross section of the electrode photographed by an electron microscope. The thickness of the negative electrode active material containing layer was 45 μm.

On the other hand, the weight of the negative electrode active material containing layer (NW) was 20 g. The charging capacity, which is obtained when the charging voltage of the negative electrode is up to 1 V with reference to the Li potential (vs. Li/Li$^+$), per weight (NC) was calculated at 150 mAh/g using NW. The charging capacity when the charging voltage of the negative electrode is up to 1 V with reference to the Li potential (vs. Li/Li$^+$) was measured as described below.

A three-electrode cell including a working electrode of 2 cm×2 cm cut out from a negative electrode, a reference electrode of an Li metal strip, and a counter electrode of Li metal foil (2.1 cm×2.1 cm) was made. The charging capacity (Ah) when the potential of the working electrode reached 1 V relative to the reference electrode by charging at a rate of 0.1 C (Li absorbing reaction) was measured, the value was divided by the weight NW (g) of the negative electrode active material containing layer in the working electrode, and the value was recorded as the charging capacity per weight NC.

The density of the negative electrode was measured as follows.

A negative electrode coated with slurry on both sides was cut out into a piece of 5 cm×5 cm, and the total weight and thickness of the electrode were measured. Subsequently, the negative electrode active material containing layer was removed from both sides of the negative electrode using acetone, the weight and thickness of the collector were measured, and the negative electrode density ρ (g/cm$^3$) was calculated by the formula (2):

$$\rho=(W_0-W_1)/((T_0-T_1)\times S) \quad (2)$$

wherein $W_0$ is the total electrode weight (g), $W_1$ the collector weight (g), $T_0$ is the electrode thickness (cm), $T_1$ is the collector thickness (cm), S is the negative electrode area, and 25 cm$^2$ in this case.

Alternatively, the negative electrode active material containing layer is removed from the negative electrode thus made, the active material is separated from the negative electrode active material containing layer using, for example, an organic solvent or aqueous solution, and then the average particle size is determined in the same manner as described above using the laser diffraction particle size distribution analyzer.

<Producing of Positive Electrode>

Lithium nickel cobalt manganese oxide ($LiNi_{0.5}Co_{0.2}Mn_{0.3}O_2$) powder having an average particle size of 5 μm as a positive electrode active material, graphite powder as a conductive material, and polyvinylidene fluoride (PVdF) as a binder were mixed at a weight ratio of 90:7:3, the mixture was dispersed in an n-methylpyrrolidone (NMP) solvent to make a slurry. The slurry was applied to aluminum foil (purity: 99.95% by weight), dried, and then the aluminum foil was pressed (pressing force: 0.25 ton/mm), thereby making a positive electrode having an electrode density of 3.3 g/cm$^3$. On the other hand, the thickness of the positive electrode current collector Ln was 13 μm from the microscopic image of a cross section of the positive electrode photographed by an electron microscope. The thickness of the positive electrode active material containing layer was 30 μm.

The weight of the positive electrode active material containing layer (PW) was 25 g. The charging capacity per weight when the maximum charging voltage of the positive electrode is up to 4 V (PC4) with reference to the Li potential (vs. Li/Li$^+$) was calculated at 125 mAh/g using PW. The charging capacity when the maximum charging voltage of the positive electrode was up to 4V with reference to the Li potential (vs. Li/Li$^+$) was measured as follows.

A three-electrode cell including a working electrode of 2 cm×2 cm cut out from a positive electrode, a reference electrode of an Li metal strip, and a counter electrode of Li metal foil (2.1 cm×2.1 cm) was made. The charging capacity (Ah) when the potential of the working electrode reached 4 V relative to the reference electrode by charging at a rate of 0.1 C (Li releasing reaction) was measured, the value was divided by the weight PW (g) of the positive electrode active material containing layer in the working electrode, and the value was recorded as the charging capacity per weight PC4.

As the material for forming the container (cladding member), a laminate film having a thickness of 0.1 mm and including an aluminum layer and a resin layer was provided. The aluminum layer of the aluminum laminate film is about 0.03 mm. The resin reinforcing the aluminum layer was polypropylene. The laminate film was bonded by heat sealing, thereby obtaining a container (cladding member).

Subsequently, a laminated electrode group including a separator made of polyethylene porous film having a thickness of 12 μm arranged between a plurality of positive electrodes and a plurality of negative electrodes was made. A plurality of positive electrode current collectors were electrically connected to a positive electrode terminal strip, and a plurality of negative electrode current collectors were electrically connected to a negative electrode terminal strip. The electrode group was inserted into a container (cladding member).

A lithium salt LiPF$_6$ was dissolved at a concentration of 1.5 mol/L in an organic solvent, which had been prepared by mixing PC and DEC at a volume ratio of 2:1, thereby preparing a liquid nonaqueous electrolyte. The nonaqueous electrolyte thus obtained was injected into a container, and a slim nonaqueous electrolyte secondary battery having the structure shown in FIG. 1 was made, the laminate size (cup size) having a thickness of 6 mm, a width of 70 mm, and a height of 110 mm.

Examples 2 to 16

Nonaqueous electrolyte secondary batteries were made in the same manner as in Example 1, except that the type of the negative electrode active material, the average particle size of the secondary particles, the type of the positive electrode active material, and Ln, Lp, NC, PC4, NC/PC4, and PW/NW were changed to the values shown in Table 1.

The Li absorbing potential of TiO$_2$ (B) in Table 1 was 1.3 V (vs. Li/Li$^+$), and the Li absorbing potential of Nb$_2$TiO$_7$ was 1.3 V (vs. Li/Li$^+$).

Comparative Examples 1 to 7

Nonaqueous electrolyte secondary batteries were made in the same manner as in Example 1, except that the type of the negative electrode active material, the average particle size of the secondary particles, the type of the positive electrode active material, and Ln, Lp, NC, PC4, NC/PC4, and PW/NW were changed to the values shown in Table 3. In Table 3, "primary particles alone" means the absence of secondary particles. In this case, the average particle size is the average particle size of the primary particles.

In Tables 1 and 3, for the parenthesized weight (g) in the column of PW/NW the left value represents the weight of the positive electrode active material containing layer, and the right value represents the weight of the negative electrode active material containing layer.

The nonaqueous electrolyte secondary battery thus obtained was subjected to the following two tests.

The first test was carried out as follows. In an environment at 80° C., the battery was charged to 2.6 V at a constant current of 3 C, and then charged at a constant voltage of 2.6 V, and the charge was finished when the current value reached 1/20 C. Thereafter, the battery was discharged to 1.5 V at 3 C. The charge and discharge were repeated to carry out high temperature cycle test. The number of cycles when the volume retention rate reached 80% was recorded as the cycle life.

The second test was high output discharge test and carried out as follows. In an environment at 25° C., the battery was charged to 2.6 V at a constant current of 1 C, and then charged at a constant voltage of 2.6 V, and the charge was finished when the current value reached 1/20 C. Thereafter, the battery was discharged once to 1.5 V at a constant current of 10 C. The discharge capacity thus obtained was represented by the value with the discharge capacity at 1 C as 100%, and the value is shown as the 100 discharge retention rate in Tables 2 and 4. The discharge capacity shown in Tables 2 and 4 is the discharge capacity at the time of discharge at 1 C.

TABLE 1

|  | Negative electrode active material | Secondary particle size (μm) | Positive electrode active material | Ln (μm) | Lp (μm) | NC (mAh/g) | PC4 (mAh/g) | NC/PC4 | PW/NW |
|---|---|---|---|---|---|---|---|---|---|
| Example 1 | Li$_{4/3}$Ti$_{5/3}$O$_4$ | 8 | LiNi$_{0.5}$Co$_{0.2}$Mn$_{0.3}$O$_2$ | 16 | 13 | 150 | 125 | 1.2 | 1.25 (25 g/20 g) |
| Example 2 | Li$_{4/3}$Ti$_{5/3}$O$_4$ | 10 | LiNi$_{0.5}$Co$_{0.2}$Mn$_{0.3}$O$_2$ | 17 | 13 | 150 | 125 | 1.2 | 1.25 (25 g/20 g) |
| Example 3 | Li$_{4/3}$Ti$_{5/3}$O$_4$ | 6 | LiNi$_{0.5}$Co$_{0.2}$Mn$_{0.3}$O$_2$ | 15 | 13 | 150 | 125 | 1.2 | 1.25 (25 g/20 g) |
| Example 4 | Li$_{4/3}$Ti$_{5/3}$O$_4$ | 15 | LiNi$_{0.5}$Co$_{0.2}$Mn$_{0.3}$O$_2$ | 17 | 13 | 150 | 125 | 1.2 | 1.25 (25 g/20 g) |
| Example 5 | Li$_{4/3}$Ti$_{5/3}$O$_4$ | 20 | LiNi$_{0.5}$Co$_{0.2}$Mn$_{0.3}$O$_2$ | 17 | 8 | 150 | 125 | 1.2 | 1.25 (25 g/20 g) |
| Example 6 | Li$_{4/3}$Ti$_{5/3}$O$_4$ | 8 | LiNi$_{0.5}$Co$_{0.2}$Mn$_{0.3}$O$_2$ | 16 | 10 | 150 | 125 | 1.2 | 1.25 (25 g/20 g) |

TABLE 1-continued

| | Negative electrode active material | Secondary particle size (μm) | Positive electrode active material | Ln (μm) | Lp (μm) | NC (mAh/g) | PC4 (mAh/g) | NC/PC4 | PW/NW |
|---|---|---|---|---|---|---|---|---|---|
| Example 7 | $Li_{4/3}Ti_{5/3}O_4$ | 8 | $LiNi_{0.5}Co_{0.2}Mn_{0.3}O_2$ | 16 | 15 | 150 | 125 | 1.2 | 1.25 (25 g/20 g) |
| Example 8 | $Li_{4/3}Ti_{5/3}O_4$ | 8 | $LiNi_{0.8}Co_{0.1}Mn_{0.1}O_2$ | 16 | 13 | 150 | 130 | 1.15 | 1.20 (24 g/20 g) |
| Example 9 | $Li_{4/3}Ti_{5/3}O_4$ | 8 | $LiNi_{1/3}Co_{1/3}Mn_{1/3}O_2$ | 16 | 13 | 150 | 120 | 1.25 | 1.30 (26 g/20 g) |
| Example 10 | $Li_{4/3}Ti_{5/3}O_4$ | 8 | $LiNi_{0.8}Co_{0.15}Al_{0.05}O_2$ | 16 | 13 | 150 | 130 | 1.15 | 1.20 (24 g/20 g) |
| Example 11 | $Li_{4/3}Ti_{5/3}O_4$ | 8 | $LiFePO_4$ | 16 | 13 | 150 | 140 | 1.07 | 1.12 (19 g/17 g) |
| Example 12 | $Li_{4/3}Ti_{5/3}O_4$ | 8 | $LiFeSO_4F$ | 16 | 13 | 150 | 130 | 1.15 | 1.18 (20 g/17 g) |
| Example 13 | $TiO_2$ (B) | 15 | $LiNi_{0.5}Co_{0.2}Mn_{0.3}O_2$ | 16 | 13 | 200 | 125 | 1.6 | 1.87 (28 g/15 g) |
| Example 14 | $Nb_2TiO_7$ | 15 | $LiNi_{0.5}Co_{0.2}Mn_{0.3}O_2$ | 16 | 13 | 220 | 125 | 1.76 | 2.23 (29 g/13 g) |
| Example 15 | $Nb_2TiO_7$ | 8 | $LiNi_{0.5}Co_{0.2}Mn_{0.3}O_2$ | 15 | 13 | 220 | 125 | 1.76 | 2.23 (29 g/13 g) |
| Example 16 | $Nb_2TiO_7$ | 8 | $LiNi_{0.8}Co_{0.1}Mn_{0.1}O_2$ | 15 | 13 | 220 | 130 | 1.69 | 2.3 (30 g/13 g) |

TABLE 2

| | Discharge capacity (Ah) | 10 C discharge capacity retention rate (%) | 80° C. cycle life (time) |
|---|---|---|---|
| Example 1 | 3 | 85 | 1200 |
| Example 2 | 3 | 75 | 1500 |
| Example 3 | 2.9 | 70 | 1000 |
| Example 4 | 2.95 | 70 | 1800 |
| Example 5 | 2.8 | 65 | 2000 |
| Example 6 | 3 | 90 | 1400 |
| Example 7 | 3 | 80 | 1000 |
| Example 8 | 3.2 | 80 | 1200 |
| Example 9 | 2.8 | 90 | 1500 |
| Example 10 | 3.3 | 80 | 1000 |
| Example 11 | 2.5 | 80 | 5000 |
| Example 12 | 2.4 | 65 | 3000 |
| Example 13 | 3.3 | 70 | 1100 |
| Example 14 | 3.5 | 80 | 1200 |
| Example 15 | 3.5 | 83 | 1100 |
| Example 16 | 3.6 | 83 | 1000 |

TABLE 3

| | Negative electrode active material | Secondary particle size (μm) | Positive electrode active material | Ln (μm) | Lp (μm) | NC (mAh/g) | PC4 (mAh/g) | NC/PC4 | PW/NW |
|---|---|---|---|---|---|---|---|---|---|
| Comparative Example 1 | $Li_{4/3}Ti_{5/3}O_4$ | 10 | $LiNi_{0.5}Co_{0.2}Mn_{0.3}O_2$ | 10 | 15 | 150 | 125 | 1.2 | 1.25 (25 g/20 g) |
| Comparative Example 2 | $Li_{4/3}Ti_{5/3}O_4$ | 1 | $LiNi_{0.5}Co_{0.2}Mn_{0.3}O_2$ | 16 | 13 | 150 | 125 | 1.2 | 1.25 (25 g/20 g) |
| Comparative Example 3 | $Li_{4/3}Ti_{5/3}O_4$ | Primary particles alone, 0.3 μm | $LiNi_{0.5}Co_{0.2}Mn_{0.3}O_2$ | 10 | 13 | 150 | 125 | 1.2 | 1.15 (23 g/20 g) |
| Comparative Example 4 | $Li_{4/3}Ti_{5/3}O_4$ | Primary particles alone, 0.5 μm | $LiNi_{0.5}Co_{0.2}Mn_{0.3}O_2$ | 10 | 13 | 150 | 125 | 1.2 | 1.15 (23 g/20 g) |
| Comparative Example 5 | $Li_{4/3}Ti_{5/3}O_4$ | Primary particles alone, 1 μm | $LiNi_{0.5}Co_{0.2}Mn_{0.3}O_2$ | 10 | 13 | 150 | 125 | 1.2 | 1.15 (23 g/20 g) |
| Comparative Example 6 | $Li_{4/3}Ti_{5/3}O_4$ | Primary particles alone, 5 μm | $LiNi_{0.5}Co_{0.2}Mn_{0.3}O_2$ | 10 | 13 | 150 | 125 | 1.2 | 1.15 (23 g/20 g) |
| Comparative Example 7 | $Li_{4/3}Ti_{5/3}O_4$ | 5 | $LiNi_{0.5}Co_{0.2}Mn_{0.3}O_2$ | 8 | 13 | 150 | 125 | 1.2 | 1.15 (23 g/20 g) |

TABLE 4

| | Discharge capacity (Ah) | 10 C discharge capacity retention rate (%) | 80° C. cycle life (time) |
|---|---|---|---|
| Comparative Example 1 | 2.8 | 55 | 500 |
| Comparative Example 2 | 2.5 | 50 | 600 |
| Comparative Example 3 | 3 | 75 | 300 |
| Comparative Example 4 | 3 | 75 | 200 |
| Comparative Example 5 | 3 | 60 | 300 |
| Comparative Example 6 | 3 | 50 | 400 |
| Comparative Example 7 | 3 | 40 | 300 |

As shown in Table 1, the nonaqueous electrolyte secondary batteries of Examples 1 to 16 satisfy the relationship represented by the formula (2). As is evident from Tables 1 to 4, the nonaqueous electrolyte secondary batteries of Examples 1 to 16 have higher high temperature cycle performance than Comparative Examples 1 to 7.

For the average particle size of the secondary particles of titanium-containing oxide particles, the 80° C. cycle life of the batteries of Examples 1, 2, 4, and 5 having an average particle size of 7 to 20 μm is higher than that of Example 3 having an average particle size of less than 7 μm, and the high temperature cycle performance is improved when the average particle size is from 7 to 20 μm.

For the constitution of the positive electrode active material, comparison of Examples 1 and 10 indicates that the battery of Example 1 is superior to that of Example 10 in the discharge capacity, 10 C discharge retention rate, and 80° C. cycle life. The use of a lithium nickel cobalt manganese composite oxide improves the discharge capacity, large current discharge performance, and high temperature cycle performance. In addition, Example 11 using olivine lithium iron phosphate showed the highest 80° C. cycle life.

The 80° C. cycle life did not reach 1000 cycle in Comparative Example 1 wherein the secondary particle size is higher than 5 μm but the Lp is thick, Comparative Example 2 wherein the Lp is thin, but the secondary particle size is less than 5 μm, Comparative Examples 3 to 6 wherein the primary particles were used alone, and Comparative Example 7 wherein the secondary particle size is 5 μm and Lp is thick.

In addition, a battery module including a unit composed of six pieces of the nonaqueous electrolyte secondary battery of each example, which are electrically connected in series, can repeat charge-discharge cycles in a wide environmental temperature range (for example −30° C. to 80° C.) at the maximum voltage of 15 V and minimum voltage of 8 V, so that showed marked compatibility with the operating voltage range of lead storage batteries and parallel operation with lead storage batteries.

The nonaqueous electrolyte battery according to at least one embodiment and example provides marked high rate charge-discharge cycle life performance and large current discharge performance at high temperatures, because the battery includes a negative electrode containing titanium-containing oxide particles having an average secondary particle size of more than 5 μm, and the thickness of the positive electrode current collector is smaller than the thickness of the negative electrode current collector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a container;
a nonaqueous electrolyte provided in the container;
a positive electrode provided in the container, the positive electrode comprising a positive electrode current collector containing Al, and a positive electrode active material containing layer formed on the positive electrode current collector comprising particles represented by $Li_xNi_{1-y-z}Co_yMn_zO_2$ ($0 \le x \le 1.1$, $0 \le y \le 0.5$, $0 < z < 0.5$); and
a negative electrode provided in the container, the negative electrode comprising a negative electrode current collector containing Al, and a negative electrode active material containing layer which is formed on the negative electrode current collector comprising titanium-containing oxide particles having an average particle size of primary particles of the titanium-containing oxide particles is 1 μm or less and an average secondary particle size from 6 μm to 20 μm,
wherein Lp is a thickness of the positive electrode current collector and Lp is from 6 μm to 15 μm, and
Ln is a thickness of the negative electrode current collector and Ln is from 10 μm to 17 μm.
Lp and Ln are selected such that the following formula (1) is satisfied:

$$Lp < Ln \quad (1)$$

wherein the nonaqueous electrolyte battery, satisfies the following formula (2):

$$(PW/NW) \ge (NC/PC4) \quad (2)$$

wherein the PW is a weight(g) of the positive electrode active material containing layer, and the NW is a weight(g) of the negative electrode active material containing layer, the PC4 is a charging capacity per weight (mAh/g) when a maximum charging voltage of the positive electrode is 4 V with reference to a Li potential (vs. Li/Li'), and the NC is a charging capacity per weight (mAh/g) when a charging voltage of the negative electrode is 1 V with reference to the Li potential (vs. Li/Li+).

2. The nonaqueous electrolyte battery according to claim 1, wherein the titanium-containing oxide particles contains one or more compounds selected from the group consisting of lithium titanium oxide, titanium oxide, and niobium titanium oxide.

3. The nonaqueous electrolyte battery according to claim 1, wherein the titanium-containing oxide particles comprise lithium titanium oxide having a spinel structure represented by $Li_{4/3+x}Ti_{5/3}O_4$ ($0 \le x \le 1.1$).

4. The nonaqueous electrolyte battery according to claim 1, wherein the positive electrode current collector is aluminum foil or aluminum alloy foil having an aluminum purity of 99% by weight or more.

5. The nonaqueous electrolyte battery according to claim 1, wherein the container is a laminate film container comprising a metal layer and a resin layer.

6. A battery module comprising six pieces of the nonaqueous electrolyte battery according to claim 1 which are electrically connected in series.

7. A battery pack comprising the battery module according to claim 6.

8. The nonaqueous electrolyte battery according to claim 1, wherein the average secondary particle size falls within a range of from 7 μm to 20 μm.

9. A battery pack comprising nonaqueous electrolyte batteries,
wherein each of the nonaqueous electrolyte batteries is the nonaqueous electrolyte battery according to claim 1, and
the nonaqueous electrolyte batteries are electrically connected in series, parallel or a combination of series and parallel.

10. The battery pack according to claim 9, which further comprises a protective circuit.

11. The battery pack according to claim 9, which further comprises an energizing terminal to be connected to an external device or external instrument.

12. The nonaqueous electrolyte battery according to claim 1, wherein the thickness Lp of the positive electrode current collector is a thickness in a direction perpendicular to a plane where the positive electrode active material containing layer formed on at least one surface of the positive electrode current collector contacts the positive electrode current collector, and the thickness Ln of the negative electrode current collector is a thickness in a direction perpendicular to a plane where the negative electrode active material containing layer formed on at least one surface of the negative electrode current collector contacts the negative electrode current collector.

13. The nonaqueous electrolyte battery according to claim 2, wherein the titanium-containing oxide particles is titanium oxide and/or niobium titanium oxide.

14. The nonaqueous electrolyte battery according to claim 1, wherein a proportion of primary particles in the titanium-containing oxide particles is from 5 to 50% by volume.

* * * * *